(12) United States Patent
Sato et al.

(10) Patent No.: US 12,555,503 B2
(45) Date of Patent: Feb. 17, 2026

(54) HEAD-UP DISPLAY DEVICE AND CONTROL METHOD THEREOF

(71) Applicant: Nippon Seiki Co., Ltd., Niigata (JP)

(72) Inventors: Yuri Sato, Niigata (JP); Yuji Inosaka, Niigata (JP); Yukihisa Hoshi, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 19/037,050

(22) Filed: Jan. 24, 2025

(65) Prior Publication Data

US 2025/0273099 A1  Aug. 28, 2025

(30) Foreign Application Priority Data

Feb. 26, 2024 (JP) ................. 2024-026157

(51) Int. Cl.
 *G09G 3/00* (2006.01)
 *G02B 27/01* (2006.01)
 *G09G 3/34* (2006.01)

(52) U.S. Cl.
 CPC ......... *G09G 3/002* (2013.01); *G02B 27/0101* (2013.01); *G09G 3/3426* (2013.01); *G02B 2027/0118* (2013.01); *G09G 2380/10* (2013.01)

(58) Field of Classification Search
 CPC .. G09G 3/002; G09G 3/3426; G09G 2380/10; G02B 27/0101; G02B 2027/0118
 See application file for complete search history.

(56) References Cited

U.S. PATENT DOCUMENTS

| 11,378,799 | B1* | 7/2022 | Gu ........................ B60K 35/23 |
| 2009/0201225 | A1* | 8/2009 | Okada ................ G02B 27/0101 345/7 |
| 2011/0074657 | A1 | 3/2011 | Sugiyama |
| 2021/0011286 | A1* | 1/2021 | Morohashi .............. B60R 11/02 |
| 2023/0054971 | A1* | 2/2023 | Hada .................. G02B 27/0179 |

FOREIGN PATENT DOCUMENTS

JP  2011-070074 A  4/2011

* cited by examiner

*Primary Examiner* — Brent D Castiaux
(74) *Attorney, Agent, or Firm* — Rimon P.C.

(57) ABSTRACT

A head-up display device includes two systems each having a backlight including light sources, a display that causes illumination light of the light sources to pass therethrough to generate display light, and a control unit that controls turning on and off of the light sources, in which, when a virtual image is displayed, a second control unit performs control such that at least some of second light sources are turned on, and, when a real image is displayed, a first control unit performs control such that at least some of first light sources are turned on, and performs control such that the power consumption of the first light sources per unit area of a first display is made to be larger than the power consumption of the second light sources per unit area of a second display when the virtual image is displayed.

7 Claims, 8 Drawing Sheets (A)

(B)

(A)

(B)

HEAD-UP DISPLAY DEVICE AND CONTROL METHOD THEREOF

CROSS-REFERENCE TO RELATED APPLICATIONS

This application claims the benefit of foreign priority to Japanese Patent Application No. 2024-026157 filed on Feb. 26, 2024, the entire contents of each of which are hereby incorporated by reference.

TECHNICAL FIELD

The present invention relates to a head-up display device and the like that have an emission port and emit display light from the emission port toward a translucent member, thereby causing a real image and a virtual image as display images represented by the display light to be visually recognized.

BACKGROUND ART

For example, FIG. 1 of Patent Document 1 describes a head-up display device (hereinafter, referred to as a HUD device 1) that has an emission port 17 and emits display light from the emission port 17 toward a translucent member WS, thereby causing at least a real image RI as a display image represented by the display light to be visually recognized. According to the HUD device 1, the HUD device 1 includes a first display element, and has a first display unit 12a that causes light emitted from a first light source 11a for the real image RI to pass therethrough and displays the real image RI of the display light, and a reflection unit 13 that reflects at least a first light beam L1 representing the real image RI displayed on the first display unit 12a toward the translucent member WS, in which the reflection unit 13 includes a first mirror 131 that reflects the first light beam L1 toward a second mirror 132 and a third mirror 133 that reflects the first light beam L1 toward the emission port 17, the first mirror 131 is arranged, along an optical path of the first light beam L1, closer to the emission port 17 than the first display unit 12a and closer to the first display unit 12a than a first optical focal point F1 of an imaging optical system including the translucent member WS, the second mirror 132, and the third mirror 133, and the third mirror 133 and the first display unit 12a are arranged such that at least a position of the third mirror 133 in the height direction is above a position of the first display unit 12a in the height direction. The HUD device 1 is described in Patent Document 1 (refer to the paragraph [0007]) unpublished as of the filing date of the present application.

In addition, FIG. 5 of Patent Document 1 illustrates a configuration in which display is performed by switching between a virtual image VI and the real image RI in the above-described HUD device 1. According to FIG. 5, in addition to the configuration illustrated in FIG. 1, the HUD device 1 includes a second display element, and further has a second display unit 12b that causes light emitted from a second light source 11b for the virtual image VI to pass therethrough and displays the virtual image VI as a display image, in which the second mirror 132 configured by, for example, a half mirror causes a second light beam L2 representing the virtual image VI displayed on the second display unit 12b to pass therethrough, the third mirror 133 reflects the second light beam L2 toward the windshield WS, and the second display unit 12b is arranged, along an optical path of the second light beam L2, closer to the emission port 17 than a position of a second optical focal point F2 of the imaging optical system including the windshield WS, the second mirror 132, and the third mirror 133, thereby causing the virtual image VI as a display image to be capable of being visually recognized by an occupant DR. Therefore, the HUD device 1 that performs display by switching between the virtual image VI and the real image RI can be realized (refer to the paragraphs [0038] and [0039]).

Patent Document 1: Japanese Patent Application No. 2023-213466

SUMMARY OF INVENTION

Technical Problem

According to the technique described in Patent Document 1, the display image is displayed while switching between the real image RI and the virtual image VI by changing the optical paths (the first light beam L1 and the second light beam L2) of the imaging optical system including the first mirror 131, the second mirror 132 (half mirror), and the third mirror 133. An illumination optical system such as a lens for displaying a real image and an illumination optical system such as a lens for displaying a virtual image are exclusively designed, and the light source of a backlight for displaying a real image emits illumination light such that the illumination light converges to the first display unit 12a, and the light source of a backlight for displaying a virtual image emits illumination light such that the illumination light diverges to the second display unit 12b. Thus, it is known that the display light is darker when the real image is displayed than when the virtual image is displayed. Therefore, when the display image is displayed after switching from the real image to the virtual image or from the virtual image to the real image, the brightness of the display image is changed, and the occupant who is a viewer may feel discomfort.

Therefore, it is an object of the present invention to provide a head-up display device and the like capable of reducing discomfort of a viewer due to a change in brightness generated when a display image is displayed after switching between a real image and a virtual image.

Other objects of the present invention will become apparent to those skilled in the art by referring to the aspects and the best mode exemplified below, and the accompanying drawings.

Solution to Problem

Hereinafter, in order to easily understand the outline of the present invention, aspects according to the present invention will be exemplified.

A first aspect according to the present invention is a head-up display device that has an emission port and emits display light from the emission port toward a translucent member, thereby causing a real image and a virtual image as display images represented by the display light to be visually recognized, the head-up display device including: a first backlight including a first light source; a first display that causes illumination light of the first light source to pass therethrough to generate first display light; a second backlight including a second light source; a second display that causes illumination light of the second light source to pass therethrough to generate second display light; an imaging optical system including a first reflection member that reflects the first display light incident from one surface and causes the second display light incident from the other surface to pass therethrough, and a second reflection member that reflects the first display light reflected by the first reflection member or the second display light that has passed through the first reflection member to guide the first display light or the second display light to the emission port, in which the first display light is emitted along a first optical path that is reflected by the first reflection member to generate the real image, and the second display light is emitted along a second optical path that passes through the first reflection member and is reflected by the second reflection member to form the virtual image; a first control unit that controls turning on and off of a plurality of the first light sources of the first backlight; and a second control unit that controls turning on and off of a plurality of the second light sources of the second backlight, in which, when the virtual image is displayed, the second control unit performs control such that at least some of the second light sources are turned on, and, when the real image is displayed, the first control unit performs control such that at least some of the first light sources are turned on, and performs control such that power consumption of the first light sources per unit area of the first display is made to be larger than power consumption of the second light sources per unit area of the second display when the virtual image is displayed.

The first aspect is configured to include the first display that causes illumination light emitted from the first light source of the first backlight for displaying the real image to be reflected by the first reflection member and emits the illumination light toward the translucent member via the second reflection member (first optical path) and generates the real image as the first display light, and the second display that causes illumination light emitted from the second light source of the second backlight for displaying the virtual image to pass through the first reflection member and emits the illumination light toward the translucent member via the second reflection member (second optical path) and generates the virtual image as the second display light, in which, when the virtual image is displayed, the second control unit performs control such that at least some of the second light sources are turned on, and, when the real image is displayed, the first control unit performs control such that at least some of the first light sources are turned on, and performs control such that the power consumption of the first light sources per unit area of the first display is made to be larger than the power consumption of the second light sources per unit area of the second display when the virtual image is displayed.

Here, "when the real image is displayed, performing control such that the power consumption of the first light sources per unit area of the first display is made to be larger than the power consumption of the second light sources per unit area of the second display when the virtual image is displayed" means, for example, (1) when the real image is displayed, performing control such that the value of the current (current value) flowing through the first light source of the first backlight is increased as compared to when the virtual image is displayed, (2) when the real image is displayed, performing control such that the number of the first light sources to be turned on is increased as compared to when the virtual image is displayed, or (3) when the real image is displayed, performing control such that the current value of the current flowing through the first light source is increased, and performing control such that the number of the first light sources to be turned on is increased as compared to when the virtual image is displayed, or when the real image is displayed, performing control such that the mounting density of the first light sources to be turned on on the outer edge side in the long-side direction of the light-source circuit mounting substrate formed of a rectangular region on which the first light sources are mounted is made to be larger than the mounting density of the second light sources to be turned on in an inner region of the outer edge side as compared to when the virtual image is displayed.

Thus, according to the first aspect, when the virtual image is displayed, the second control unit turns on all the second light sources of the second backlight, and, when the real image is displayed, the first control unit turns on all the first light sources of the first backlight and makes the power consumption of the first light sources per unit area larger than that when the virtual image is displayed by increasing the value of the current (current value) flowing through one first light source, so that the brightness when the real image is displayed can be improved, as a result, the difference (change) in the brightness when the display is switched to the virtual image or the real image can be reduced, and the discomfort of the occupant who is a viewer when the display is switched can be suppressed. Moreover, the second control unit may turn on some of the second light sources of the second backlight when the virtual image is displayed, and the first control unit may turn on all the first light sources of the first backlight when the real image is displayed. In this case, the brightness of the display images of the light sources may be the same in the real image display and the virtual image display, or control such that the light sources are turned on more brightly when the real image is displayed may be performed. Furthermore, according to the first aspect, since the light sources do not need to be shared between the virtual image and the real image, lenses in consideration of the light distribution characteristics of both the virtual image and the real image can be optimally designed. Accordingly, appropriate brightness and uniformity can be obtained in both the virtual image display and the real image display, and the display quality can be improved.

In a second aspect depending from the first aspect, when the real image is displayed, the first control unit may perform control such that a current value of a current flowing through the first light source is increased as compared to when the virtual image is displayed by the second control unit.

In the second aspect, when the real image is displayed, the first control unit performs control such that the value of the current (current value) flowing through the first light source of the first backlight is increased as compared to when the virtual image is displayed by the second control unit. Thus, particularly, when the display is switched from the virtual image to the real image, the difference (change) in the brightness from when the virtual image is displayed can be reduced without changing the lighting area of the first light sources mounted on the first light-source circuit substrate of the first backlight, and the discomfort of the occupant who is a viewer when the display is switched can be suppressed.

In a third aspect depending from the first aspect, when the real image is displayed, the first control unit may perform control such that the number of the first light sources to be turned on is increased as compared to when the virtual image is displayed by the second control unit.

In the third aspect, when the display is switched from the virtual image to the real image, the first control unit increases the number of the first light sources to be turned on, which are mounted on the first light-source circuit substrate of the first backlight. Thus, the difference (change) in the brightness when the real image is displayed and when the virtual image is displayed can be reduced, and the discomfort of the occupant who is a viewer when the display is switched can be suppressed.

In a fourth aspect depending from the first aspect, when the real image is displayed, the first control unit may perform control such that a current value of a current flowing through the first light source is increased, and may perform control such that the number of the first light sources to be turned on is increased as compared to when the virtual image is displayed by the second control unit.

In the fourth aspect, when the display is switched from the virtual image to the real image, the first control unit increases the brightness of the first light sources of the first backlight and increases the number of the first light sources to be turned on, which are mounted on the first light-source circuit substrate. Thus, the difference (change) in the brightness when the real image is displayed and when the virtual image is displayed can be further reduced, and the discomfort of the occupant who is a viewer when the display is switched can be suppressed.

In a fifth aspect depending from the first to fourth aspects, the first control unit may emit the illumination light of the first light source such that the illumination light converges to the first display, and the second control unit may emit the illumination light of the second light source such that the illumination light diverges to the second display.

In the fifth aspect, the first control unit emits the illumination light of the first light source of the first backlight such that the illumination light converges to the first display, and the second control unit emits the illumination light of the second light source of the second backlight such that the illumination light diverges to the second display. Thus, the light use efficiency can be improved in accordance with the light distribution characteristics required when the real image is displayed and when the virtual image is displayed.

In a sixth aspect depending from the first to fifth aspects, when the real image is displayed, the first control unit may perform control such that a mounting density of the first light sources to be turned on on an outer edge side in a long-side direction of a light-source circuit mounting substrate formed of a rectangular region on which the first light sources are mounted is made to be larger than a mounting density of the second light sources to be turned on in an inner region of the outer edge side as compared to when the virtual image is displayed by the second control unit.

In the sixth aspect, when the real image is displayed, the first control unit increases the mounting density of the light sources to be turned on on the outer edge side in the long-side direction of the first light-source circuit substrate on which the first light sources of the first backlight are mounted. Thus, the difference (change) in the brightness when the real image is displayed and when the virtual image is displayed can be further reduced, and the discomfort of the occupant who is a viewer due to the outer edge portion becoming dark, particularly, when the display is switched from the virtual image to the real image can be suppressed.

A seventh aspect according to the present invention is a control method of a head-up display device that includes: a first backlight including a plurality of first light sources; a first display that causes illumination light of the first light sources to pass therethrough to generate first display light; a second backlight including a plurality of second light sources; a second display that causes illumination light of the second light sources to pass therethrough to generate second display light; an imaging optical system including a first reflection member that reflects the first display light incident from one surface and causes the second display light incident from the other surface to pass therethrough, and a second reflection member that reflects the first display light reflected by the first reflection member or the second display light that has passed through the first reflection member to guide the first display light or the second display light to an emission port, in which the first display light is emitted along a first optical path that is reflected by the first reflection member to generate a real image, and the second display light is emitted along a second optical path that passes through the first reflection member and is reflected by the second reflection member to form a virtual image; a first control unit that controls turning on and off of the plurality of first light sources of the first backlight; and a second control unit that controls turning on and off of the plurality of second light sources of the second backlight, and emits the first display light or the second display light from the emission port toward a translucent member, thereby causing the real image or the virtual image as a display image represented by the first display light or the second display light to be visually recognized, the control method including: when the second control unit displays the virtual image, a step of performing control such that at least some of the second light sources are turned on; and, when the first control unit displays the real image, a step of performing control such that at least some of the first light sources are turned on, and performing control such that power consumption of the first light sources per unit area of the first display is made to be larger than power consumption of the second light sources per unit area of the second display when the virtual image is displayed.

The seventh aspect is configured to include the first display that causes illumination light emitted from the first light sources of the first backlight for displaying the real image to be reflected by the first reflection member and emits the illumination light toward the translucent member via the second reflection member (first optical path) and generates the real image as the first display light, and the second display that causes illumination light emitted from the second light sources of the second backlight for displaying the virtual image to pass through the first reflection member and emits the illumination light toward the translucent member via the second reflection member (second optical path) and generates the virtual image as the second display light, and to have a control procedure (steps) including, when the second control unit displays the virtual image by switching the imaging optical system to the second optical path, performing control such that at least some of the second light sources are turned on, and, when the first control unit displays the real image by switching the imaging optical system to the first optical path, performing control such that at least some of the first light sources are turned on, and performing control such that the power consumption of the first light sources per unit area of the first display is made to be larger than the power consumption of the second light sources per unit area of the second display when the virtual image is displayed.

Thus, according to the seventh aspect, when the virtual image is displayed, the second control unit turns on all the second light sources of the second backlight, and, when the real image is displayed, the first control unit turns on all the first light sources of the first backlight and makes the power consumption of the first light sources per unit area larger than that when the virtual image is displayed by increasing the value of the current (current value) flowing through one first light source, so that the brightness when the real image is displayed can be improved, as a result, the difference (change) in the brightness when the real image is displayed and when the virtual image is displayed can be reduced, and the discomfort of the occupant who is a viewer when the display is switched can be suppressed. Moreover, the second control unit may turn on some of the second light sources of the second backlight when the virtual image is displayed, and the first control unit may turn on all the first light sources of the first backlight when the real image is displayed. In this case, the brightness of the light sources may be the same in the real image display and the virtual image display, or control such that the light sources are turned on more brightly when the real image is displayed may be performed. Furthermore, according to the seventh aspect, lenses in consideration of the light distribution characteristics of both the virtual image and the real image can be optimally designed. Accordingly, appropriate brightness and uniformity can be obtained in both the virtual image display and the real image display, and the display quality can be improved.

Those skilled in the art will readily understand that the exemplified aspects according to the present invention may be further modified without departing from the spirit of the present invention.

DESCRIPTION OF EMBODIMENTS

The best mode described below is used to facilitate understanding of the present invention. Therefore, those skilled in the art should note that the present invention is not unreasonably limited by the embodiment described below (hereinafter, referred to as the present embodiment).

Configuration of Embodiment

Figure 1:
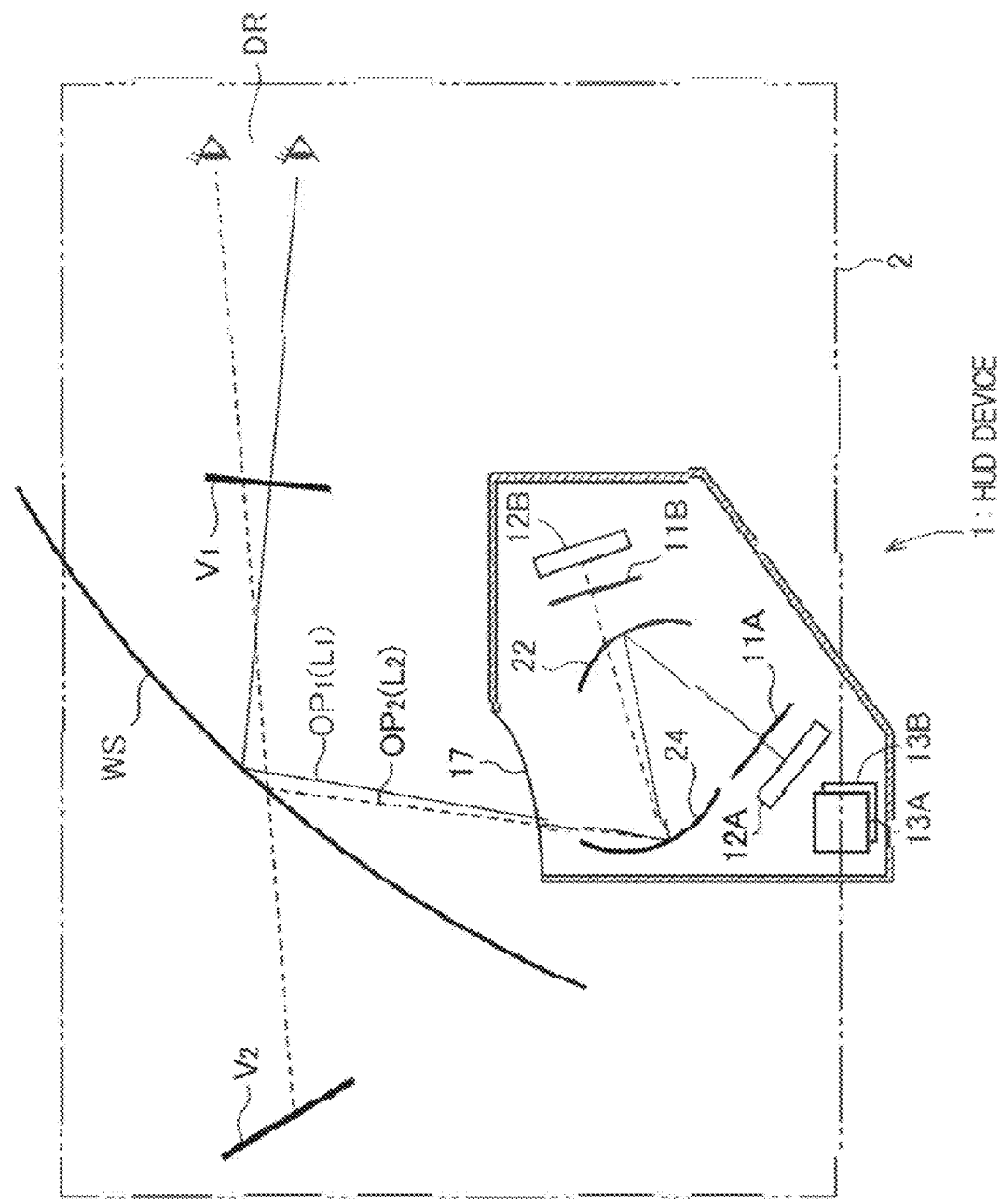
FIG. 1 is a diagram illustrating an example of a configuration of a head-up display device according to an embodiment of the present invention, which includes an imaging optical system.

Refer to FIG. 1. FIG. 1 is a diagram illustrating an example of a configuration of a head-up display device (hereinafter, referred to as a HUD device 1 unless otherwise noted) according to the present embodiment, which includes an imaging optical system 2. The HUD device 1 of the present embodiment includes a light source (first light source, refer to 14A in FIG. 6A) that emits white light in a visible wavelength range, is made of, for example, a light-emitting diode (LED), and is mounted on a light-source circuit substrate (refer to 140A in FIG. 6A), a backlight 12A (first backlight) including lenses for condensing light emitted by the light source 14A, and a display 11A (first display) such as a liquid crystal display (LCD) panel that causes illumination light of the light source 14A to pass therethrough to generate first display light L1 (real image). The light-source circuit substrate 140A is connected to a control unit 13A (control circuit substrate), which will be described below, by wiring (not illustrated), and is controlled by the control unit 13A, so that the LED as the light source 14A is controlled to be turned on or off.

Figure 6A:
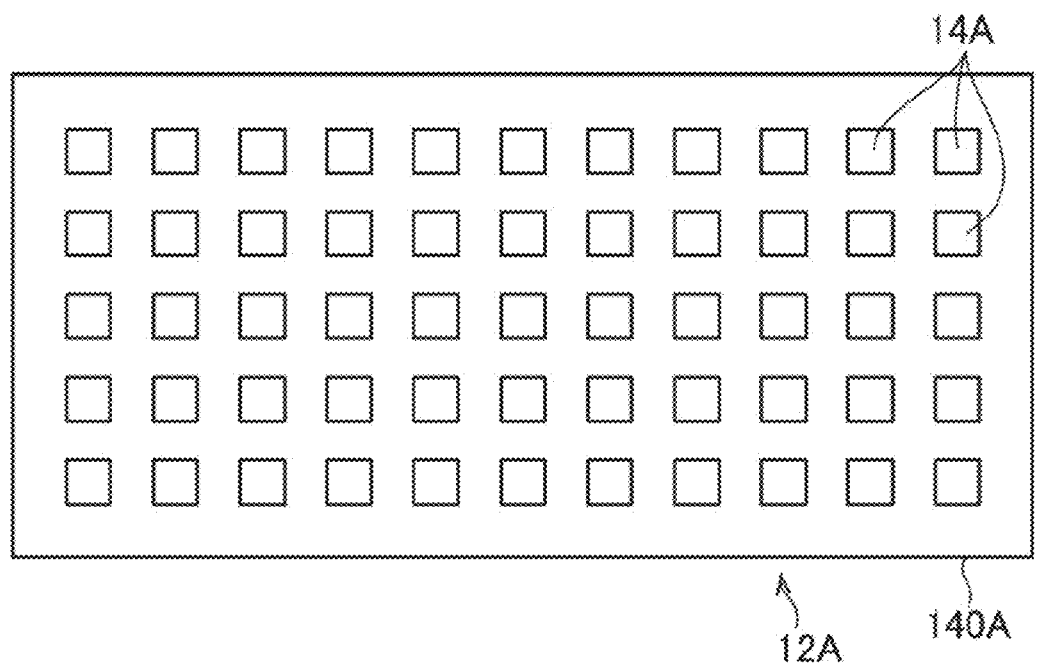
FIGS. 6A and 6B are diagrams illustrating examples of arrangements (layouts) of a plurality of light sources mounted on backlights of the head-up display device according to the embodiment of the present invention.
Figure 6B:
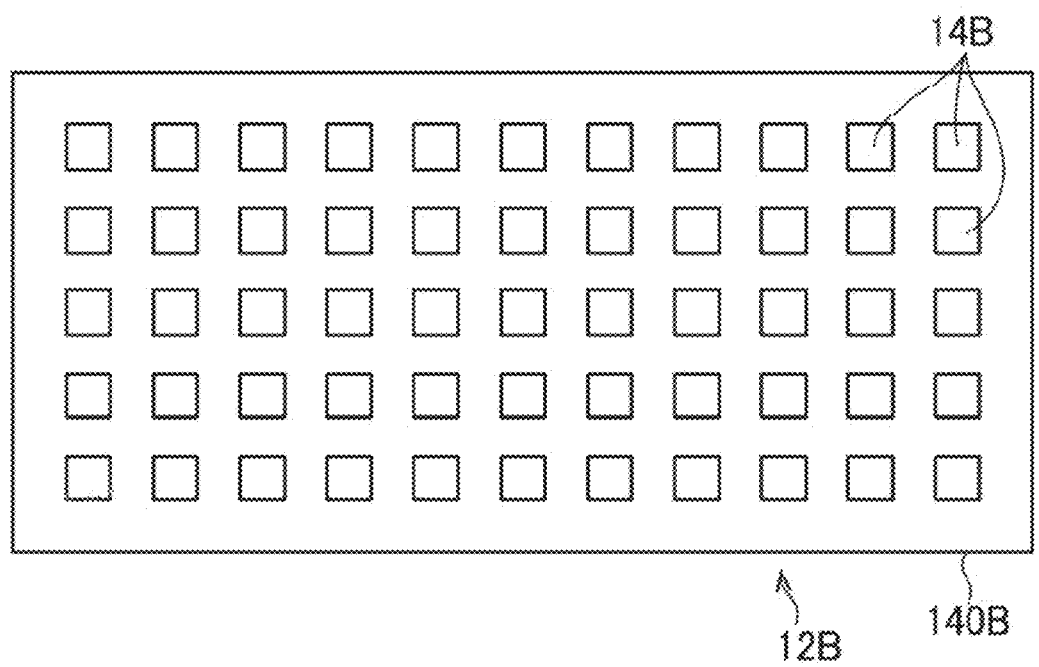

Moreover, the HUD device 1 of the present embodiment includes a light source (second light source, refer to 14B in FIG. 6B) that emits white light in a visible wavelength range and is mounted on a light-source circuit substrate (being a first light-source circuit substrate, refer to 140B in FIG. 6B), a backlight 12B (second backlight) including lenses for condensing light emitted by the light source 14B, and a display 11B (second display) such as an LCD panel that causes illumination light of the light source 14B to pass therethrough to generate second display light L2 (virtual image). The light-source circuit substrate 140B is connected to a control unit 13B (control circuit substrate), which will be described below, by wiring (not illustrated), and is controlled by the control unit 13B, so that the LED as the light source 14B is controlled to be turned on or off.

Furthermore, the HUD device 1 of the present embodiment forms the imaging optical system 2 including a first reflection member 22 configured by, for example, a half mirror that reflects the first display light L1 incident from one surface and causes the second display light L2 incident from the other surface to pass therethrough, and a second reflection member 24 that reflects the first display light L1 reflected by the first reflection member 22 or the second display light L2 that has passed through the first reflection member 22 to guide the first display light L1 or the second display light L2 to an emission port 17, in which the first display light L1 is emitted along a first optical path OP1 that is reflected by the first reflection member 22 to generate a real image V1, and the second display light L2 is emitted along a second optical path OP2 that passes through the first reflection member 22 and is reflected by the second reflection member 24 to form a virtual image.

Although an infinite number of light beams are originally emitted from the displays 11A and 11B, only representative light beams emitted from the centers of the displays 11A and 11B and passing through the center of an eye box are indicated by a solid line (real image V1) and a broken line (virtual image V2) in order to simplify the description. In addition, the first reflection member 22 is not limited to a half mirror, and may be any member as long as it reflects the first display light L1 on one surface and causes the second display light L2 to pass therethrough on the other surface.

For example, a member to which a wavelength-selective film is attached or a coated transmissive member may be used.

The first display light L1 and the second display light L2 emitted from the displays 11A and 11B, respectively, are finally projected toward a windshield WS, which is a translucent member, through the emission port 17 that is an opening provided in the upper part of a housing of the HUD device 1. Accordingly, an occupant DR who is a viewer riding a vehicle can visually recognize the real image V1 formed on the front side of the windshield WS (on the vehicle inner side of the windshield WS) and the virtual image V2 formed on the back side of the windshield WS (on the vehicle outer side of the windshield WS) by visually recognizing the first display light L1 and the second display light L2 reflected by the windshield WS.

The HUD device 1 of the present embodiment further has the control units 13A (first control unit) and 13B (second control unit) that control switching between the first optical path OP1 and the second optical path OP2 of the imaging optical system 2 described above and control turning on and off of a plurality of light sources (not illustrated in FIG. 1) of the backlights 12A and 12B. When the virtual image V2 is displayed by switching the imaging optical system 2 to the second optical path (OP2), the control unit 13B (second control unit) performs control such that at least some of the light sources 14B are turned on. On the other hand, when the real image V1 is displayed by switching the imaging optical system 2 to the first optical path (OP1), the control unit 13A (first control unit) performs control such that at least some of the light sources 14A (first light sources) are turned on, and performs control such that the power consumption of the light sources 14A (first light sources) per unit area of the display 11A (first display) is made to be larger than the power consumption of the light sources 14B (second light sources) per unit area of the display 11B (second display) when the virtual image V2 is displayed.

Here, "when the real image is displayed, performing control such that the power consumption of the first light sources per unit area of the first display is made to be larger than the power consumption of the second light sources per unit area of the second display when the virtual image is displayed" means, for example, (1) when the real image is displayed, performing control such that the value of the current (current value) flowing through the first light source of the first backlight is increased as compared to when the virtual image is displayed, (2) when the real image is displayed, performing control such that the number of the first light sources to be turned on is increased as compared to when the virtual image is displayed, or (3) when the real image is displayed, performing control such that the current value of the current flowing through the first light source is increased, and performing control such that the number of the first light sources to be turned on is increased as compared to when the virtual image is displayed, or when the real image is displayed, performing control such that the mounting density of the first light sources to be turned on on the outer edge side in the long-side direction of the light-source circuit mounting substrate formed of a rectangular region on which the first light sources are mounted is made to be larger than the mounting density of the second light sources to be turned on in an inner region of the outer edge side as compared to when the virtual image is displayed.

As will be described below, the control units 13A and 13B can also perform control of display content on the displays 11A and 11B, respectively. Details will be described below.

Figure 2A:
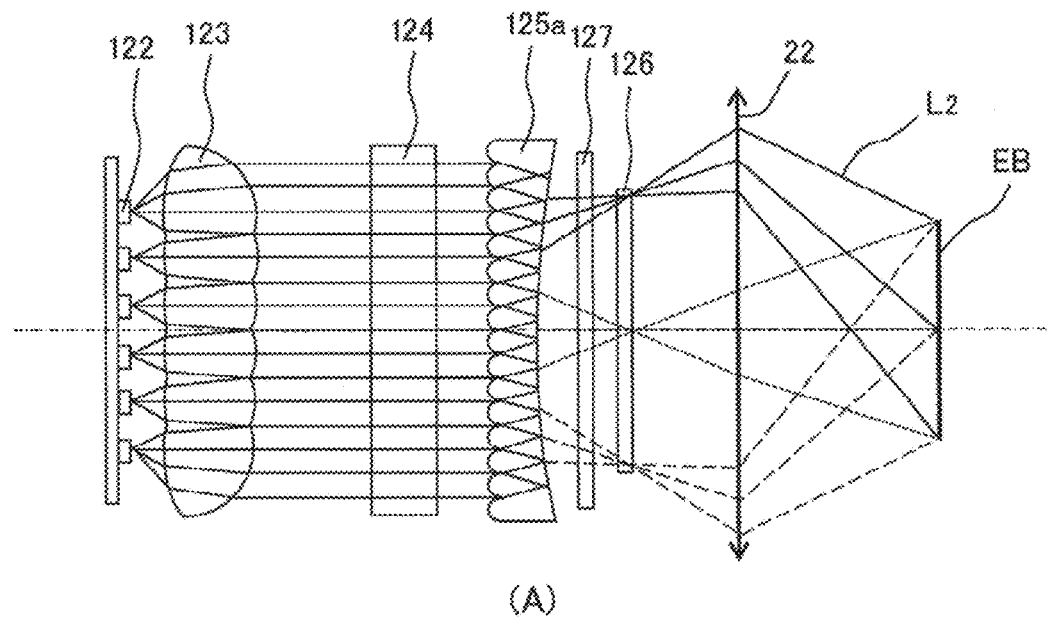
FIGS. 2A and 2B are diagrams illustrating an example of a lens configuration and an optical path between a backlight and a display when a virtual image is displayed in the head-up display device according to the embodiment of the present invention.
Figure 2B:
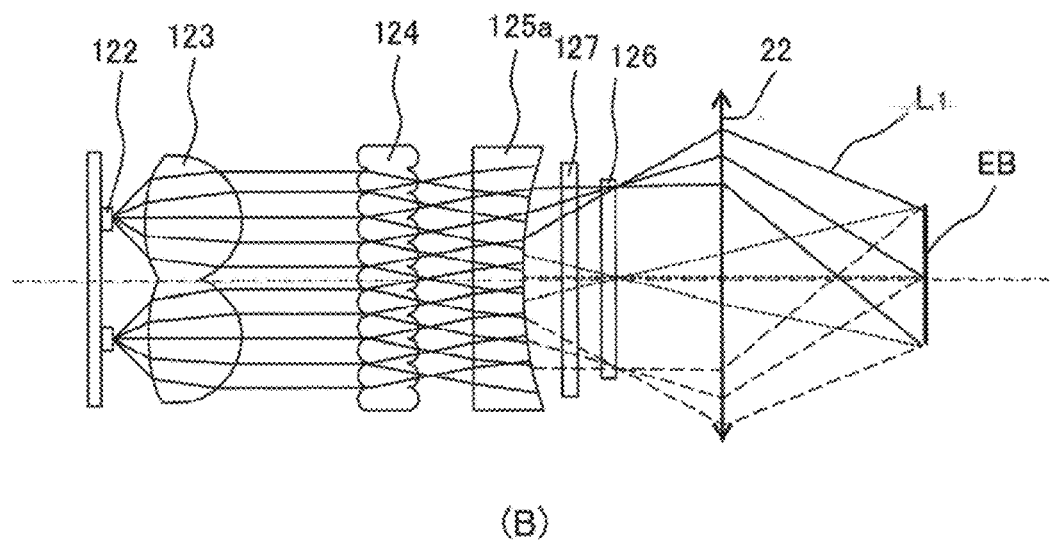
Figure 3A:
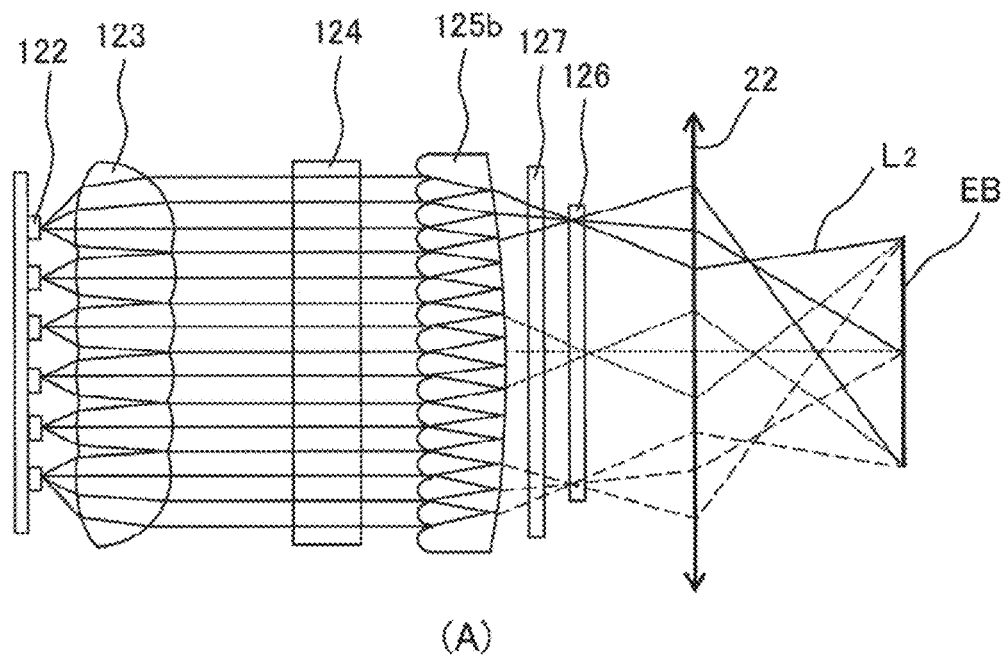
FIGS. 3A and 3B are diagrams illustrating an example of a lens configuration and an optical path between a backlight and a display when a real image is displayed in the head-up display device according to the embodiment of the present invention.
Figure 3B:
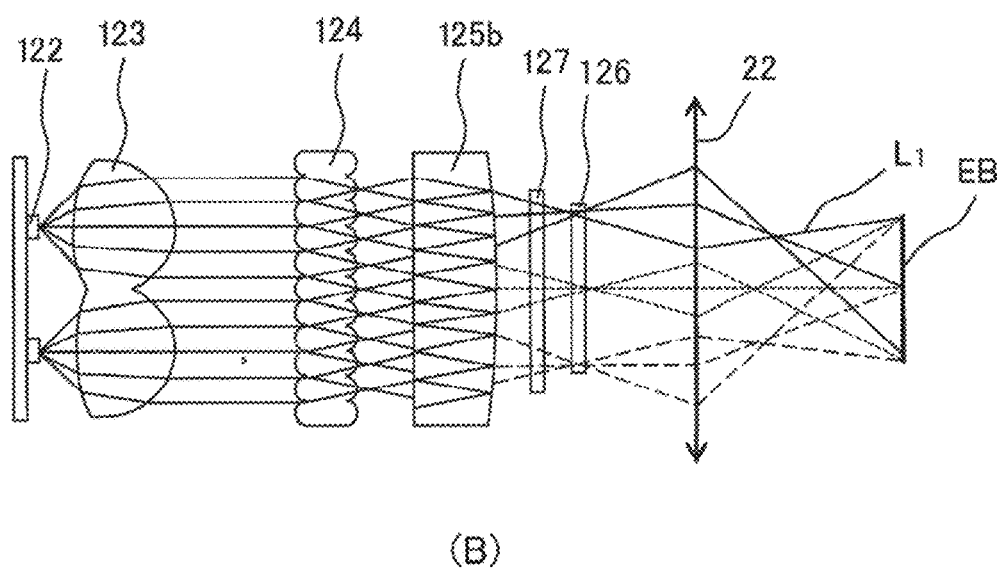

Refer to FIGS. 2A, 2B, 3A, and 3B. FIGS. 2A and 2B are diagrams illustrating an example of a lens configuration and the optical path (second optical path OP2) of the display 11B when the virtual image V2 is displayed in the HUD device 1 of the present embodiment, and FIGS. 3A and 3B are diagrams illustrating an example of a lens configuration and the optical path (first optical path OP1) of the display 11A when the real image V1 is displayed in the HUD device 1 of the present embodiment.

An illumination optical system for displaying the real image V1 and an illumination optical system for displaying the virtual image V2 used in the HUD device 1 of the present embodiment are independently controlled by the control units 13A and 13B, respectively, and thus optimized and designed exclusively for the control units 13A and 13B. Lenses of the illumination optical system for displaying the real image V1 and the illumination optical system for displaying the virtual image V2 are designed so as to satisfy both the light distribution characteristics in which the optical axis narrows in both the vertical direction (V) and the horizontal direction (H) required when the real image V1 is displayed (the light source of the backlight 12A emits illumination light such that the illumination light converges to the display) and the light distribution characteristics in which the optical axis spreads in both the vertical direction (V) and the horizontal direction (H) required when the virtual image V2 is displayed (the light source of the backlight 12B emits illumination light such that the illumination light diverges to the display) (for example, a condenser lens 123 and lenticular lenses 124 and 125 illustrated in FIGS. 2A and 2B, which are included in an illumination optical system and will be described below), and excellent brightness and uniformity can be obtained in both a visual recognition state of the virtual image V2 and a visual recognition state of the real image V1.

FIG. 2A illustrates the lens configuration and the optical path in the H direction, and FIG. 2B illustrates the lens configuration and the optical path in the V direction when the virtual image V2 is displayed. In FIGS. 2A and 2B, light emitted from an LED (122 in this case) serving as the light source 14B is converted into parallel light which is substantially parallel to the optical axis in both the H direction and the V direction by the condenser lens 123. A light receiving surface of the first lenticular lens 124 on the side of the light source 122 has a structure in which a plurality of cylindrical lenses having a convex curved surface on the side of the LED 122 in a cross section in the V direction are arranged in parallel along the V direction. An exit surface of the first lenticular lens 124 has a structure in which a plurality of cylindrical lenses having a convex curved surface on the exit side of the second display light L2 in a cross section in the V direction are arranged in parallel along the V direction. With such a structure, the first lenticular lens 124 condenses the light of the LED 122 in the V direction to form a multiple image.

A light receiving surface of the second lenticular lens 125 on the side of the LED 122 has a structure in which a plurality of cylindrical lenses having a convex curved surface on the side of the LED 122 in a cross section in the H direction are arranged along the H direction. An exit surface of the second lenticular lens 125 is a toroidal surface having a concave shape in both the V direction and the H direction. With such a configuration, the second lenticular lens 125 condenses the light of the LED 122 in the H direction to form a multiple image, and aligns the direction of the light with the subsequent imaging optical system 2. The second lenticular lens 125 for displaying the virtual image V2 is referred to as a first lens 125a.

The second display light L2 emitted from the first lens 125a is diffused by a diffuser plate 127 (not illustrated in FIG. 1) to reduce brightness unevenness and the like. The display light L2 diffused by the diffuser plate 127 is incident on an LCD panel 126, which is the display 11B (refer to FIG. 1), to generate an image in accordance with the control of a control board 162 (the control unit 13B in FIG. 1), and is emitted to the subsequent first reflection member 22. With such a lens configuration and an optical path, the occupant DR can visually recognize the virtual image V2 with appropriate brightness and uniformity.

On the other hand, FIGS. 3A and 3B are diagrams illustrating an example of a lens configuration and the optical path (OP1) when the real image V1 is displayed in the HUD device 1 of the present embodiment. FIG. 3A illustrates the lens configuration and the optical path in the H direction, and FIG. 3B illustrates the lens configuration and the optical path in the V direction. In FIGS. 3A and 3B, the condenser lens 123 and the first lenticular lens 124 have the same configurations as those in FIGS. 2A and 2B. That is, the condenser lens 123 converts the light emitted from the LED 122 into parallel light in both the H direction and the V direction, and the first lenticular lens 124 condenses the light of the LED 122 in the V direction to form a multiple image.

Also, regarding the second lenticular lens 125, the function of condensing the light of the LED 122 in the H direction to form a multiple image is the same as that in the case of FIGS. 2A and 2B. Therefore, as in the case of FIGS. 2A and 2B, the light receiving surface on the side of the LED 122 has a structure in which a plurality of cylindrical lenses having a convex curved surface on the side of the LED 122 in a cross section in the H direction are arranged along the H direction. On the other hand, in order to realize the light distribution characteristics (the light source 14A for displaying a real image (the LED 122 in this case) emits illumination light such that the illumination light converges to the display 11A for displaying the real image V1, and the light source 14B for displaying a virtual image emits illumination light such that the illumination light diverges to the display 11B for displaying the virtual image V2), the exit surface is a toroidal surface having a convex shape in both the V direction and the H direction. By forming the exit surface into a convex shape, the light distribution characteristics are narrowed in both the H direction and the V direction. The second lenticular lens 125 for displaying the real image V1 is referred to as a second lens 125b.

The first display light L1 emitted from the second lens 125b is diffused by the diffuser plate 127 (not illustrated in FIG. 1) to reduce brightness unevenness and the like, is incident on the display 11A (the LCD panel 126 in this case) to generate an image (first display light L1) in accordance with the control of the control board 162, and is emitted to the subsequent first reflection member 22. As illustrated in FIGS. 3A and 3B, when the real image V1 is displayed, in order to generate the real image V1, the optical axes in the H direction and the V direction are made to intersect between the windshield WS and the viewpoint EB (eye box) of the occupant DR who is a viewer. In this case, the intersection of the optical axes can be freely set in accordance with the position and magnification of the real image V1 to be displayed. With such a lens configuration and an optical path, the occupant DR can visually recognize the real image V1 with appropriate brightness and uniformity.

Figure 4:
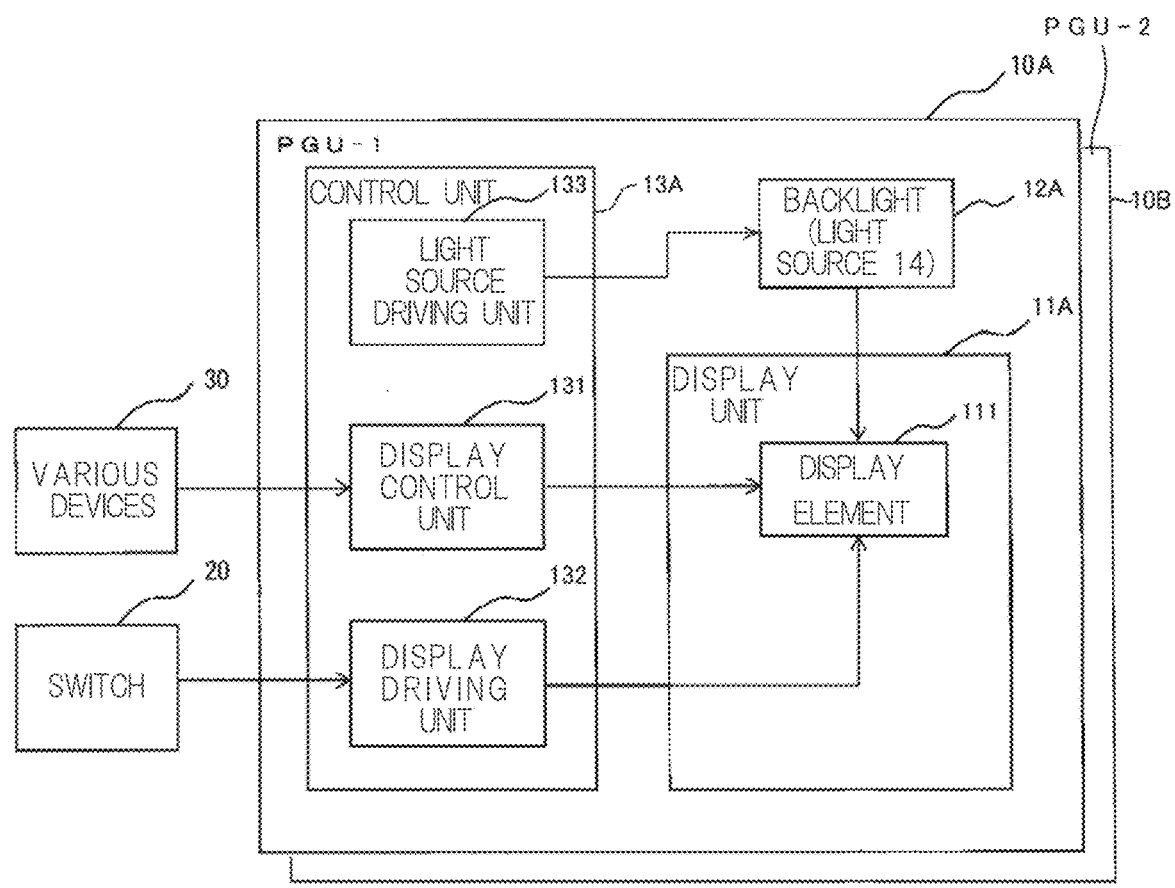
FIG. 4 is a diagram illustrating an example of a configuration of a control system of the head-up display device according to the embodiment of the present invention.

Refer to FIG. 4. FIG. 4 is a diagram illustrating an example of a configuration of a control system of the HUD device 1 of the present embodiment, specifically, is a functional configuration diagram illustrating a configuration of a picture generation unit PGU-1 (PGU 10A), and includes the control unit 13A illustrated in FIG. 1. The HUD device 1 of the present embodiment further has a PGU-2 (PGU 10B), and also includes the control unit 13B illustrated in FIG. 1. The picture generation unit refers to a control system for image generation and display, only a minimum necessary configuration directly related to the HUD device 1 of the present embodiment is illustrated in FIG. 4, and other known configurations are omitted.

In FIG. 4, the PGU-1 (PGU 10A) includes the display 11A, the backlight 12A (light source 14A), and the control unit 13A. The control unit 13A includes a display control unit 131 that issues a command to the display 11A to generate the first display light L1 (real image V1) representing a display image on the basis of information or a signal transmitted from various devices 30 such as a vehicle speed sensor, a navigation device, a radio detecting and ranging (RADAR), and a light detection and ranging (LiDAR).

Moreover, the control unit 13A includes a display drive unit 132 that generates an image with the light emitted from the light source 14A of the backlight 12A, switches the polarization of light to be emitted to a first polarized light state and a second polarized light state different from each other, and performs switching control of the polarizing direction of the display 11A that generates the first display light L1 representing a display image, on the basis of a signal transmitted from a switch 20 for switching, for example, a vehicle driving mode (manual driving, automatic driving).

Furthermore, the control unit 13A includes a light source drive unit 133 that controls power to be supplied necessary for turning on and off the light source 14A of the backlight 12A, which is mounted on the light-source circuit substrate 140A (refer to FIG. 6A). The light source drive unit 133 controls ON/OFF timing of each LED as the light source 14A, which is mounted on the light-source circuit substrate 140A, and the value of the current (current value) flowing through each LED, and also controls the voltage supplied to the light source 14A, so that the power efficiency can be improved. When the real image VI is displayed by switching the imaging optical system 2 to the OP1 (first optical path), the control unit 13A can perform control such that at least some of the light sources 14A (first light sources) of the backlight 12A are turned on, and can perform control such that the power consumption of the light sources 14A (first light sources) per unit area of the display 11A (first display) is made to be larger than the power consumption of the light sources 14B (second light sources) per unit area of the display 11B (second display) when the virtual image V2 is displayed.

A display unit 11A (same as the display 11A) includes a thin film transistor (TFT) type display element 111 that forms the first display light L1 representing a figure having a freely-selected shape on the basis of a signal transmitted from the display control unit 131. For example, during automatic driving, the display drive unit 132 performs switching control. At this time, the display control unit 131 controls the display element 111 to generate the display light L1 representing an assistant or an agent that supports the driving of the occupant DR, a character indicating the assistant or the agent, or the like.

The PGU-2 (10B) also has the same configuration as that of the PGU-1 (10A), and includes a display unit 11B (same as the display 11B), the backlight 12B (light source 14B), and the control unit 13B (all are not illustrated). The control unit 13B has the display control unit 131, the display drive unit 132, and the light source drive unit 133. The display control unit 131 controls the display element 111 to generate the display light L2 representing vehicle information, route guidance information, warning display, and the like. The light source drive unit 133 performs lighting control of the second light source 14B of the second backlight 12B, and can perform control, when the virtual image V2 is displayed, such that at least some of the second light sources 14B of the second backlight 12B are turned on.

As described above, in the HUD device 1 of the present embodiment, when the real image V1 is to be displayed, the control unit 13A switches the imaging optical system 2 to the optical path OP1 (first optical path) in which the first display light L1 (real image V1) generated by the display unit 11A (same as the display 11A in FIG. 1) is reflected by the first reflection member 22, so that the first display light L1 is further reflected by the second reflection member 24 to be incident on the windshield WS, which is a translucent member, and is reflected by the windshield WS to form the real image V1 that is displayable on the vehicle inner side of the windshield WS in front of the occupant DR (in an imaging area virtually set in a state of standing vertically with respect to the road surface). On the other hand, in the HUD device 1 of the present embodiment, when the virtual image V2 is to be displayed, the control unit 13B switches the imaging optical system 2 to the optical path OP2 (second optical path) in which the display light L2 generated by the display 11B is caused to pass through the first reflection member 22, so that the display light L2 is further reflected by the second reflection member 24 to be incident on the windshield WS, which is a translucent member, and is reflected by the windshield WS to form the virtual image V2 that is displayable on the vehicle outer side of the windshield WS (in an imaging area virtually set in front of the vehicle and set in a state of being inclined with respect to the road surface).

That is, for example, the imaging area of the real image V1 having an angle of 45 degrees or more with respect to the road surface is assumed to be used in a scene such as viewing entertainment content during automatic driving or stopping, and there is an advantage that the visibility is improved due to the real image V1 being displayed in a state of standing with respect to the road surface. On the other hand, for example, in the imaging area of the virtual image V2 having an angle of less than 45 degrees with respect to the road surface, the display content appears to be developed on the road surface. Therefore, when navigation or the like is performed, the display content appears to be superimposed on the road surface, and there is an advantage that intuitive information presentation is possible.

Operation of Embodiment

Figure 5:
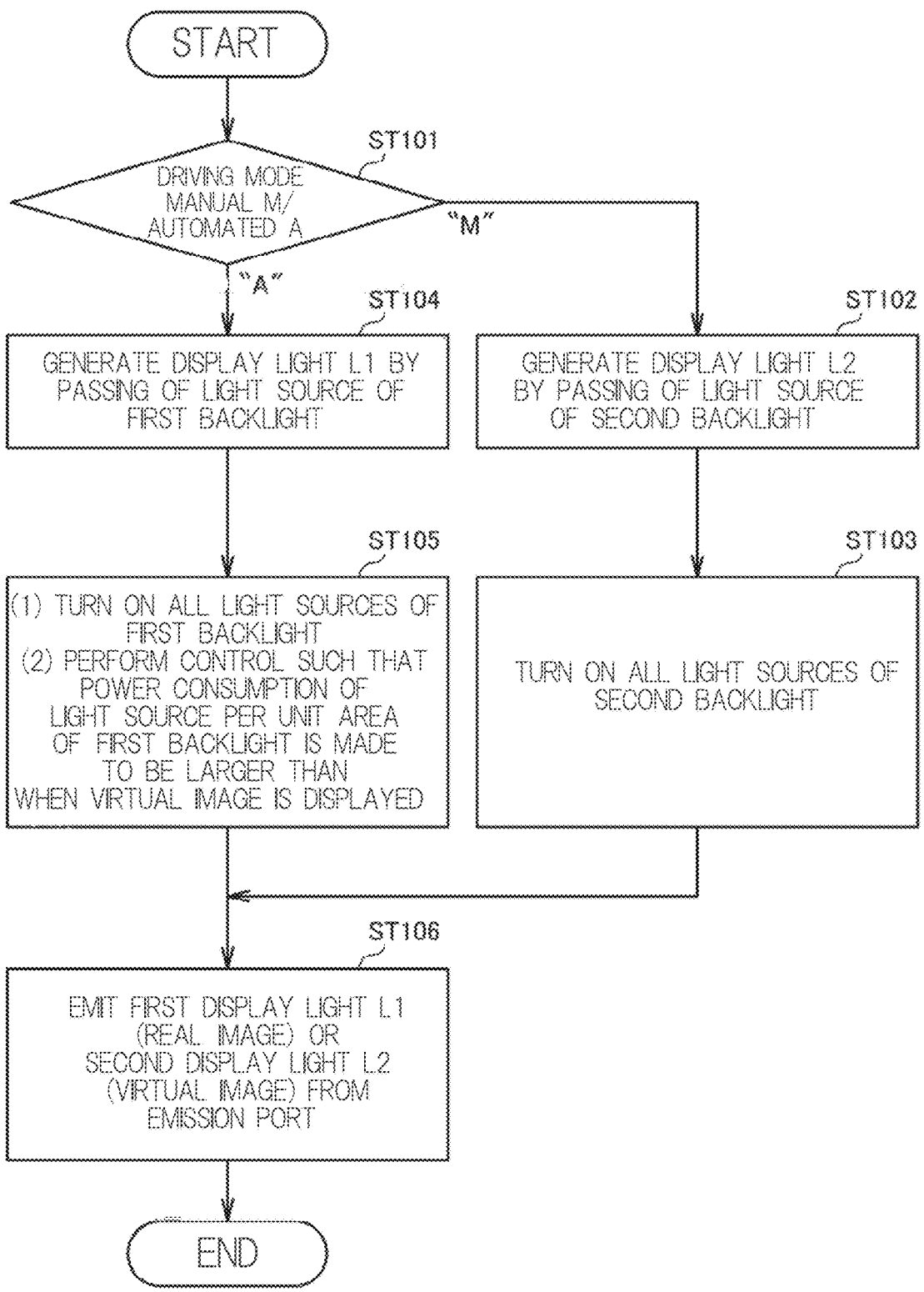
FIG. 5 is a flowchart illustrating an example of an operation of the control system of the head-up display device according to the embodiment of the present invention.

Refer to FIG. 5. FIG. 5 is a flowchart illustrating an example of an operation of the control system of the HUD device 1 of the present embodiment. In addition, FIGS. 6A and 6B are diagrams illustrating examples of arrangements (layouts) of the plurality of light sources 14A and 14B mounted on the backlights 12A and 12B of the HUD device 1 of the present embodiment. Hereinafter, with reference to FIGS. 5, 6A, and 6B, the operation of the control system (the PGU 10A and the PGU 10B, mainly the control unit 13A and the control unit 13B) of the HUD device 1 of the present embodiment illustrated in FIG. 4 will be described in detail.

In the PGU 10A, first, the control unit 13B (display drive unit 132) determines whether the vehicle is in manual driving or in automatic driving on the basis of a signal transmitted from the switch 20 for switching a vehicle driving mode (manual driving, automatic driving) (step ST101). When it is determined that the vehicle is in manual driving (step ST101 "M"), the control unit 13B (display control unit 131) controls the display element 111 of the display unit 11B (display 11B) to generate the display light L2 (virtual image V2) representing vehicle information, route guidance information, warning display, and the like (step ST102).

Subsequently, for example, as illustrated in FIG. 6B as an example of the arrangement (layout) of the light sources 14B on the light-source circuit substrate 140B, the control unit 13B (light source drive unit 133) performs control such that at least some of the LEDs (all the LEDs in this case) as the light sources 14B are turned on (step ST103), and the display unit 11B emits (projects) the generated first display light L1 (real image) toward the windshield WS, which is a translucent member, via the imaging optical system 2 (optical path OP1) and the emission port 17 (step ST106).

On the other hand, in step ST101, when the vehicle is in automatic driving (step ST101 "A"), the control unit 13A (display drive unit 132) drive-controls the display element 111 to generate the display light L1 representing an assistant or an agent that supports the driving of the occupant DR, a character indicating the assistant or the agent, or the like (step ST104).

Next, for example, as illustrated in FIG. 6A as an example of the arrangement (layout) of the light sources 14A on the light-source circuit substrate 140A, the control unit 13A (light source drive unit 133) performs control such that at least some of the LEDs (all the LEDs in this case) as the light sources 14A are turned on, and also performs control such that power to be supplied to the first light sources 14A mounted on the light-source circuit substrate 140A of the first backlight 12A is increased as compared to when the virtual image is displayed (step ST105). When the power to be supplied to the light sources 14A are controlled, the power consumption is increased, and the brightness when the real image V1 is displayed is made to be larger than that when the virtual image V2 is displayed, for example, by performing control such that the value of the current (current value) flowing through the first light sources 14A of the first backlight 12A is increased, by performing control such that the number of the first light sources 14A to be turned on (lighting area) is increased, or by performing both.

Figure 7A:
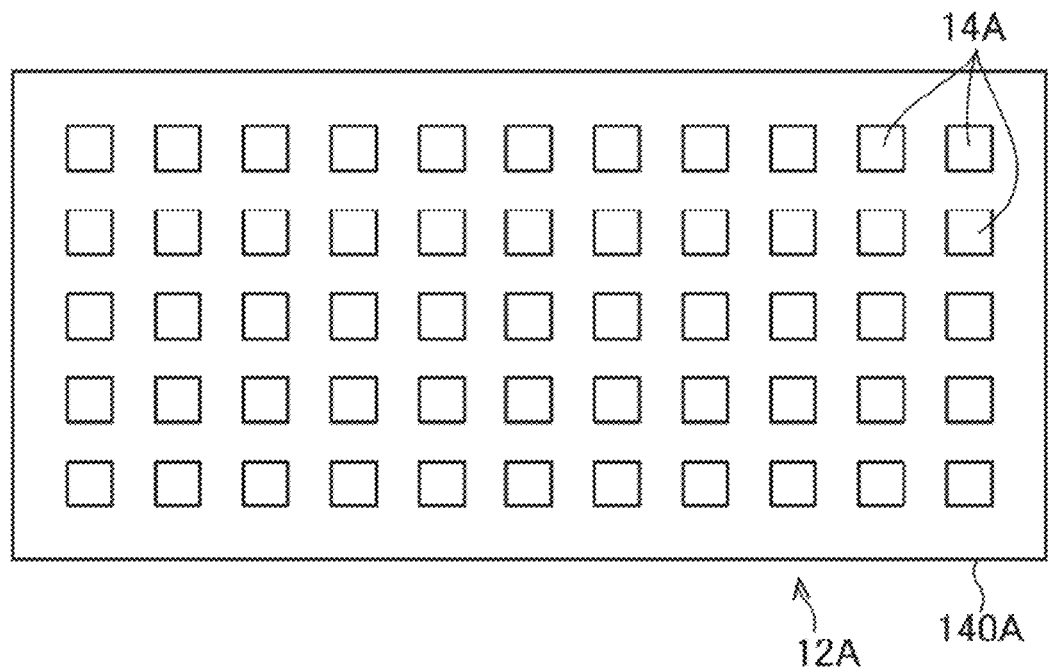
FIGS. 7A and 7B are diagrams illustrating examples of light-source lighting patterns of the plurality of light sources mounted on the backlights when the virtual image is displayed and when the real image is displayed of the head-up display device according to the embodiment of the present invention.
Figure 7B:
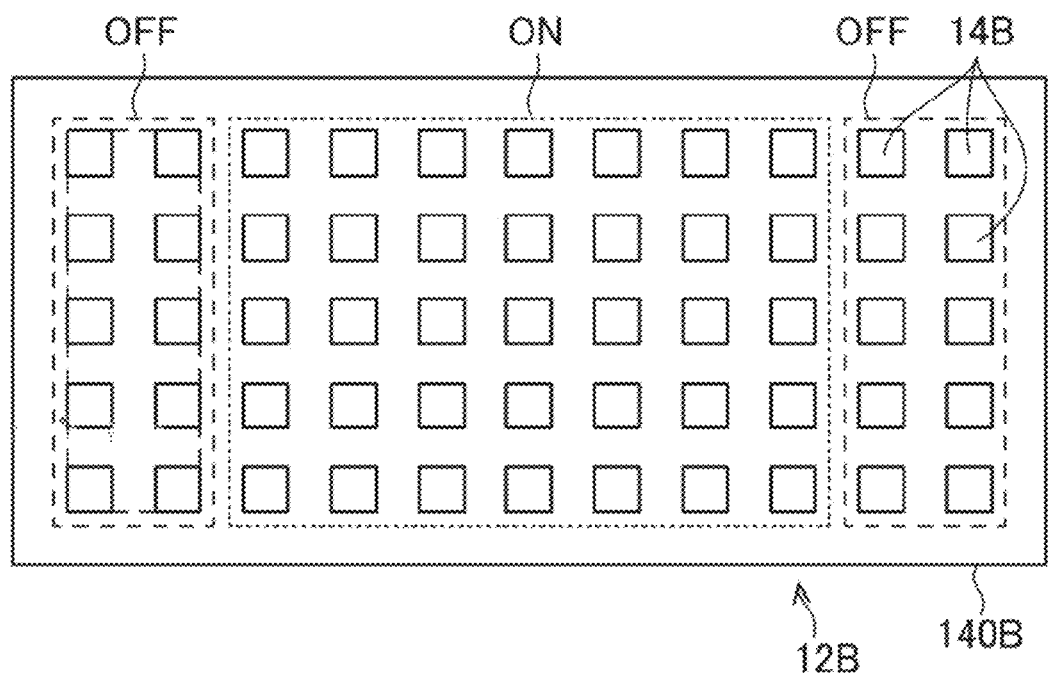
Figure 8A:
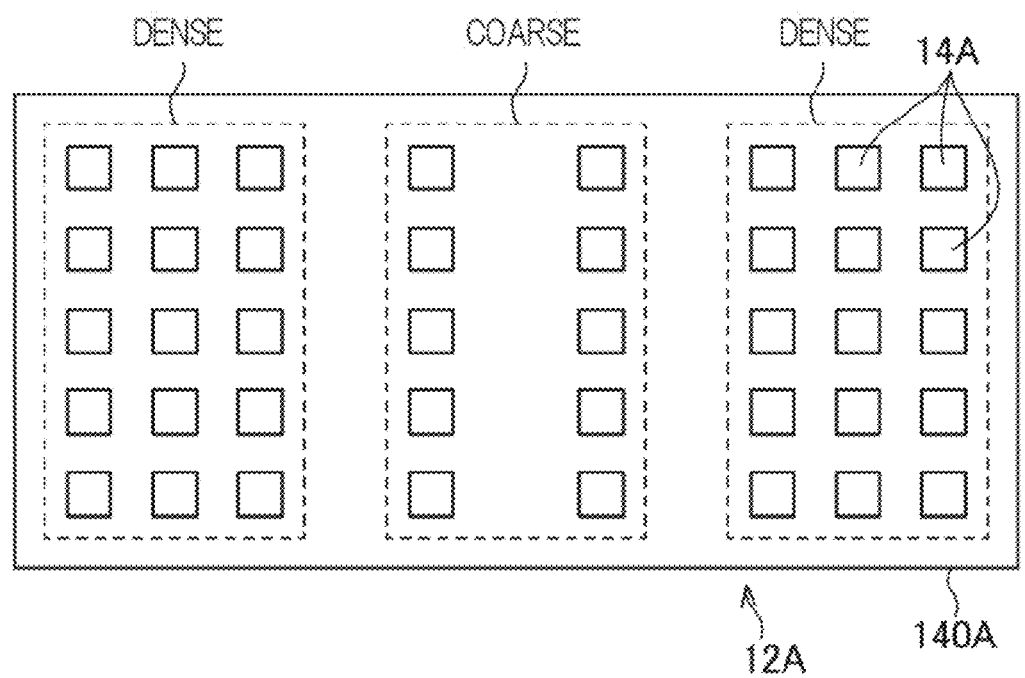
FIGS. 8A and 8B are diagrams illustrating other examples of the light-source lighting patterns of the plurality of light sources mounted on the backlights when the virtual image is displayed and when the real image is displayed of the head-up display device according to the embodiment of the present invention.
Figure 8B:
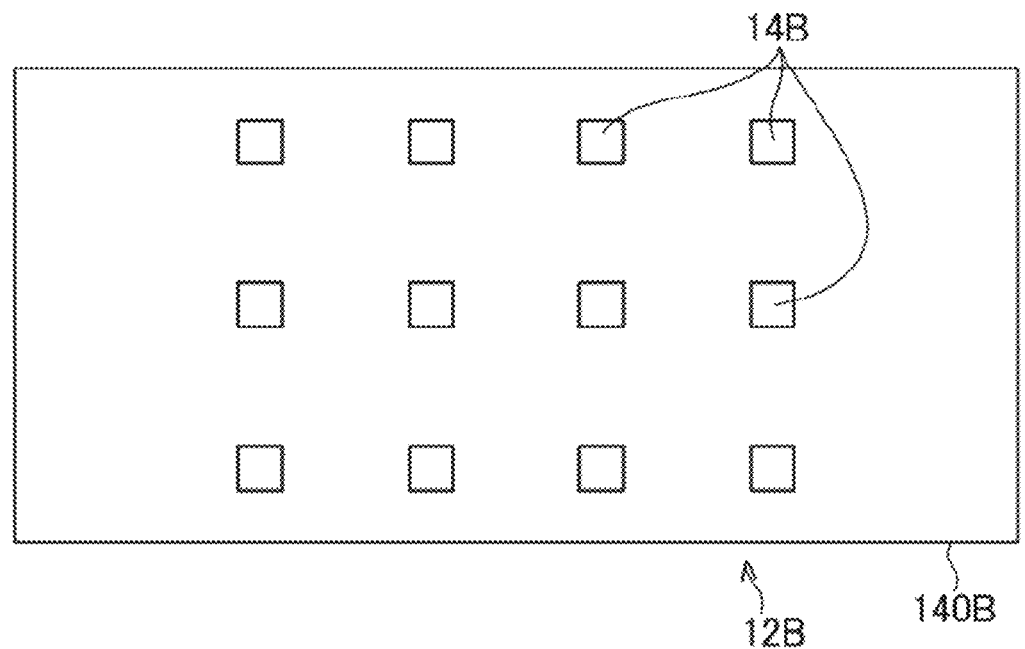

Moreover, for example, control such that only some of the second light sources 14B of the second backlight 12B are turned on (indicated as ON) when the virtual image V2 is displayed, as illustrated in FIG. 7B, and such that all the first light sources 14A of the first backlight 12A are turned on when the real image V1 is displayed, as illustrated in FIG. 7A, may be performed. In this case, the brightness of the light sources (14A, 14B) may be the same when the virtual image V2 is displayed and when the real image V1 is displayed, or the light sources may be turned on more brightly when the real image V1 is displayed. Furthermore, when the real image V1 is displayed, as illustrated in FIG. 8A, the number of the first light sources 14A to be turned on, which are mounted on the outer edge portion of the light-source circuit substrate 140A, may be increased (indicated as "dense" in the drawing) as compared to when the virtual image is displayed, as illustrated in FIG. 8B. Lighting patterns of the light sources illustrated in FIGS. 7A, 7B, 8A, and 8B will be described below in detail.

Finally, the display unit 11A emits (projects) the generated first display light L1 (real image V1) toward the windshield WS, which is a translucent member, via the imaging optical system 2 (optical path OP1) and the emission port 17 (step ST106).

FIGS. 7A and 7B illustrate examples of the lighting patterns of the light sources 14A and the light sources 14B mounted on the backlight 12A and the backlight 12B when the real image V1 is displayed (FIG. 7A) and when the virtual image V2 is displayed (FIG. 7B) of the HUD device 1 of the present embodiment. In FIG. 7B, a light source mounted region surrounded by a broken line and indicated as ON is turned on, and a light source mounted region surrounded by a broken line and indicated as OFF is turned off.

In the lighting pattern of the light sources 14B of the backlight 12B when the virtual image V2 is displayed as illustrated in FIG. 7B, the light sources 14B laid out in two rows on each of the left and right sides of the outer edge portion in the long-side direction (horizontal direction) of the rectangular light-source circuit substrate 140B are turned off (indicated as OFF), and the light sources 14B laid out therebetween are turned on (indicated as ON). On the other hand, all the first light sources 14A of the backlight 12A when the real image V1 is displayed as illustrated in FIG. 7A are turned on. The brightness of each light source 14B of the backlight 12B in the lighting pattern of the second light sources 14B when the virtual image V2 is displayed as illustrated in FIG. 7B may be the same as that when the real image V1 is displayed as illustrated in FIG. 7A.

FIGS. 8A and 8B illustrate other examples of the lighting patterns of the light sources 14A and the light sources 14B mounted on the backlight 12A and the backlight 12B when the real image V1 is displayed (FIG. 8A) and when the virtual image V2 is displayed (FIG. 8B) of the HUD device 1 of the present embodiment. In the light-source lighting pattern when the real image V1 is displayed as illustrated in FIG. 8A, the light sources 14A arranged and turned on in three rows on each of the left and right sides of the edge portion in the long-side direction (horizontal direction) of the rectangular light-source circuit substrate 140A are "densely" mounted, and the light sources 14A arranged therebetween are "sparsely" mounted (indicated as "coarse"). On the other hand, the light sources 14B when the virtual image V2 is displayed as illustrated in FIG. 8B are "sparsely" mounted on the light-source circuit substrate 140B (indicated as "coarse") as a whole.

As described above, by devising the number of the light sources 14A and 14B to be turned on (FIGS. 7A and 7B) and the arrangement of the lighted light sources 14A and 14B (FIGS. 8A and 8B), a difference in brightness (brightness difference) of the display image between when the real image V1 is displayed and when the virtual image V2 is displayed can be reduced, and the discomfort of the occupant DR due to a change in brightness (brightness change) of the display images during display switching between the virtual image V2 and the real image V1 can be suppressed.

Effect of Invention

As described above, for example, as illustrated in FIG. 1, a head-up display device of the present embodiment is the HUD device 1 that has the emission port 17 and emits the first display light L1 and the second display light L2 from the emission port 17 toward the translucent member WS, thereby causing the real image V1 and the virtual image V2 as display images represented by the first display light L1 and the second display light L2 to be visually recognized. The HUD device 1 includes the first backlight 12A including the first light source (refer to 14A in FIG. 6A), the first display 11A that causes illumination light of the first light source 14A to pass therethrough to generate the first display light L1, the second backlight 12B including the second light source (refer to 14B in FIG. 6B), the second display 11B that causes illumination light of the second light source 14B to pass therethrough to generate the second display light L2, the imaging optical system 2 including the first reflection member 22 that reflects the first display light L1 incident from one surface and causes the second display light L2 incident from the other surface to pass therethrough, and the second reflection member 24 that reflects the first display light L1 reflected by the first reflection member 22 or the second display light L2 that has passed through the first reflection member 22 to guide the first display light L1 or the second display light L2 to the emission port 17, in which the first display light L1 is emitted along the first optical path OP1 that is reflected by the first reflection member 22 to generate the real image V1, and the second display light L2 is emitted along the second optical path OP2 that passes through the first reflection member 22 and is reflected by the second reflection member 24 to form the virtual image V2, the first control unit 13A that controls turning on and off of a plurality of the first light sources 14A of the first backlight 12A, and the second control unit 13B that controls turning on and off of a plurality of the second light sources 14B of the second backlight 12B, in which, when the virtual image V2 is displayed, the second control unit 13B performs control such that at least some of the second light sources 14B are turned on, and, when the real image VI is displayed, the first control unit 13A performs control such that at least some of the first light sources 14A are turned on, and performs control such that the power consumption of the first light sources 14A per unit area of the first display 11A is made to be larger than the power consumption of the second light sources 14B per unit area of the second display 11B when the virtual image V2 is displayed.

The HUD device 1 of the present embodiment is configured to include the first display 11A that causes illumination light emitted from the first light source 14A of the first backlight 12A for displaying the real image V1 to be reflected by the first reflection member 22 and emits the illumination light toward the translucent member WS via the second reflection member 24 (first optical path OP1) and generates the real image V1 as the first display light L1, and the second display 11B that causes illumination light emitted from the second light source 14B of the second backlight 12B for displaying the virtual image V2 to pass through the first reflection member 22 and emits the illumination light toward the translucent member WS via the second reflection member 24 (second optical path OP2) and generates the virtual image V2 as the second display light L2, in which, when the virtual image V2 is displayed, the second control unit 13B performs control such that at least some of the second light sources 14B are turned on, and, when the real image V1 is displayed, the first control unit 13A performs control such that at least some of the first light sources 14A are turned on, and performs control such that the power consumption of the first light sources 14A per unit area of the first display 11A is made to be larger than the power consumption of the second light sources 14B per unit area of the second display 11B when the virtual image V2 is displayed.

According to the HUD device 1 of the present embodiment, when the virtual image V2 is displayed, the second control unit 13B turns on all the second light sources 14B of the second backlight 12B, and, when the real image V1 is displayed, the first control unit 13A turns on all the first light sources 14A of the first backlight 12A and performs control such that the power consumption of the first light sources 14A per unit area is made to be larger than that when the virtual image V2 is displayed by, for example, increasing the value of the current (current value) flowing through one first light source 14A, so that the brightness of the display image when the real image V1 is displayed can be increased, as a result, the difference (change) in the brightness of the display image when the display is switched to the virtual image V2 or the real image V1 can be reduced, and the discomfort of the occupant DR who is a viewer when the display is switched can be suppressed.

Moreover, the second control unit 13B may turn on some of the second light sources 14B of the second backlight 12B when the virtual image V2 is displayed, and the first control unit 13A may turn on all the first light sources 14A of the first backlight 12A when the real image V1 is displayed. In this case, the brightness of the light sources may be the same in the real image V1 display and the virtual image V2 display, or control such that the light sources are turned on more brightly when the real image V1 is displayed may be performed. Furthermore, according to the HUD device 1 of the present embodiment, lenses in consideration of the light distribution characteristics of both the virtual image V2 and the real image V1 can be optimally designed. Accordingly, appropriate brightness and uniformity can be obtained in both the virtual image V2 display and the real image V1 display, and the display quality can be improved.

According to the HUD device 1 of the present embodiment, when the real image V1 is displayed, the first control unit 13A performs control such that the value of the current (current value) flowing through the first light source 14A of the first backlight 12A is increased as compared to when the virtual image V2 is displayed by the second control unit 13B. Thus, particularly, when the display is switched from the virtual image V2 to the real image V1, the difference (change) in the brightness of the display image from when the virtual image V2 is displayed can be reduced without changing the lighting area of the first light sources 14A mounted on the first light-source circuit substrate 140A of the first backlight 12A, and the discomfort of the occupant DR who is a viewer when the display is switched can be suppressed.

According to the HUD device 1 of the present embodiment, when the display is switched from the virtual image V2 to the real image V1, the first control unit 13A increases the number of the first light sources 14A to be turned on, which are mounted on the first light-source circuit substrate 140A of the first backlight 12A. Thus, the difference (change) in the brightness of the display images when the real image V1 is displayed and when the virtual image V2 is displayed can be reduced, and the discomfort of the occupant DR who is a viewer when the display is switched can be suppressed.

According to the HUD device 1 of the present embodiment, when the display is switched from the virtual image V2 to the real image V1, the first control unit 13A performs control such that the brightness of the first light sources 14A of the first backlight 12A is increased and the number of the first light sources 14A to be turned on, which are mounted on the first light-source circuit substrate 140A, is increased. Thus, the difference (change) in the brightness of the display images when the real image V1 is displayed and when the virtual image V2 is displayed can be further reduced, and the discomfort of the occupant DR who is a viewer when the display is switched can be suppressed.

According to the HUD device 1 of the present embodiment, the first control unit 13A emits the illumination light of the first light source 14A of the first backlight 12A such that the illumination light converges to the first display 11A, and the second control unit 13B emits the illumination light of the second light source 14B of the second backlight 12B such that the illumination light diverges to the second display 11B. Thus, the light use efficiency can be improved in accordance with the light distribution characteristics required when the real image V1 is displayed and when the virtual image V2 is displayed.

According to the HUD device 1 of the present embodiment, when the real image V1 is displayed, the first control unit 13A increases the mounting density of the light sources 14A to be turned on on the outer edge side in the long-side direction of the first light-source circuit substrate 140A on which the first light sources 14A of the first backlight 12A are mounted.

Thus, the difference (change) in the brightness of the display images when the real image V1 is displayed and when the virtual image V2 is displayed can be further reduced, and the discomfort of the occupant DR who is a viewer due to the outer edge portion becoming dark, particularly, when the display is switched from the virtual image V2 to the real image V1 can be suppressed.

A control method of a head-up display device of the present embodiment is a control method of the HUD device 1 that includes, for example, as illustrated in FIG. 1, the first backlight 12A including a plurality of first light sources 14A, the first display 11A that causes illumination light of the first light sources 14A to pass therethrough to generate the first display light L1, the second backlight 12B including a plurality of second light sources 14B, the second display 11B that causes illumination light of the second light sources 14B to pass therethrough to generate the second display light L2, the imaging optical system 2 including the first reflection member 22 that reflects the first display light L1 incident from one surface and causes the second display light L2 incident from the other surface to pass therethrough, and the second reflection member 24 that reflects the first display light L1 reflected by the first reflection member 22 or the second display light L2 that has passed through the first reflection member 22 to guide the first display light L1 or the second display light L2 to the emission port 17, in which the first display light L1 is emitted along the first optical path OP1 that is reflected by the first reflection member 22 to generate the real image V1, and the second display light L2 is emitted along the second optical path OP2 that passes through the first reflection member 22 and is reflected by the second reflection member 24 to form the virtual image V2, the first control unit 13A that controls turning on and off of the plurality of first light sources 14A of the first backlight 12A, and the second control unit 13B that controls turning on and off of the plurality of second light sources 14B of the second backlight 12B, and emits the first display light L1 or the second display light L2 from the emission port 17 toward the translucent member WS, thereby causing the real image V1 or the virtual image V2 as a display image represented by the first display light L1 or the second display light L2 to be visually recognized. For example, as illustrated in FIG. 5, the control method includes, when the second control unit 13B displays the virtual image V2, a step of performing control such that at least some of the second light sources 14B are turned on (refer to ST101 "M" to ST103), and, when the first control unit 13A displays the real image V1, a step of performing control such that at least some of the first light sources 14A are turned on, and performing control such that the power consumption of the first light sources 14A per unit area of the first display 11A is made to be larger than the power consumption of the second light sources 14B per unit area of the second display 11B when the virtual image V2 is displayed (refer to ST101 "A," ST104, and ST105).

The control method of the HUD device 1 of the present embodiment is configured to include the first display 11A that causes illumination light emitted from the first light sources 14A of the first backlight 12A for displaying the real image V1 to be reflected by the first reflection member 22 and emits the illumination light toward the translucent member WS via the second reflection member 22 (first optical path OP1) and generates the real image V1 as the first display light L1, and the second display 11B that causes illumination light emitted from the second light sources 14B of the second backlight 12B for displaying the virtual image V2 to pass through the first reflection member 22 and emits the illumination light toward the translucent member WS via the second reflection member 24 (second optical path OP2) and generates the virtual image V2 as the second display light L2, and to have a control procedure (refer to FIG. 5) including, when the second control unit 13B displays the virtual image V2, performing control such that at least some of the second light sources 14B are turned on, and, when the first control unit 13A displays the real image V1, performing control such that at least some of the first light sources 14A are turned on, and performing control such that the power consumption of the first light sources 14A per unit area of the first display 11A is made to be larger than the power consumption of the second light sources 14B per unit area of the second display 11B when the virtual image V2 is displayed.

Thus, according to the control method of the HUD device 1 of the present embodiment, when the virtual image V2 is displayed, the second control unit 13B turns on all the second light sources 14B of the second backlight 12B, and, when the real image V1 is displayed, the first control unit 13A turns on all the first light sources 14A of the first backlight 12A and makes the power consumption of the first light sources 14A per unit area larger than that when the virtual image V2 is displayed by increasing the value of the current (current value) flowing through one first light source 14A, so that the brightness when the real image V1 is displayed can be improved, as a result, the difference (change) in the brightness of the display images when the real image V1 is displayed and when the virtual image V2 is displayed can be reduced, and the discomfort of the occupant DR who is a viewer when the display is switched can be suppressed. Moreover, the second control unit 13B may turn on some of the second light sources 14B of the second backlight 12B when the virtual image V2 is displayed, and the first control unit 13A may turn on all the first light sources 14A of the first backlight 12A when the real image V1 is displayed. In this case, the brightness of the light sources may be the same in the real image V1 display and the virtual image V2 display, or control such that the light sources are turned on more brightly when the real image V1 is displayed may be performed. Furthermore, according to the control method of the HUD device 1 of the present embodiment, lenses in consideration of the light distribution characteristics of both the virtual image V2 and the real image V1 can be optimally designed. Accordingly, appropriate brightness and uniformity can be obtained in both the virtual image V2 display and the real image V1 display, and the display quality can be improved.

Although the windshield WS is used as a translucent member in the present embodiment, a flat glass or a combiner may be used.

The present invention is not limited to the above-described exemplary embodiment, and those skilled in the art can easily modify the above-described exemplary embodiment to the extent that the above-described exemplary embodiment is included in the scope of the claims.

REFERENCE SIGNS LIST 1 head-up display device (HUD device)
2 imaging optical system
10A picture generation unit (PGU-1)
10B picture generation unit (PGU-2)
11A first display
11B second display
12A first backlight
12B second backlight
13A first control unit
13B second control unit
14A first light source
14B second light source
17 emission port
20 switch
30 various devices
22 first reflection member
24 second reflection member
111 display element
131 display control unit
132 display drive unit
133 light source drive unit
140A first light-source circuit substrate
140B second light-source circuit substrate
V1 real image
V2 virtual image
L1 first display light
L2 second display light
OP1 first optical path
OP2 second optical path

The invention claimed is:

1. A head-up display device that has an emission port and emits display light from the emission port toward a translucent member, thereby causing a real image and a virtual image as display images represented by the display light to be visually recognized, the head-up display device comprising:
 a first backlight including a first light source;
 a first display that causes illumination light of the first light source to pass therethrough to generate first display light;
 a second backlight including a second light source;
 a second display that causes illumination light of the second light source to pass therethrough to generate second display light;
 an imaging optical system including a first reflection member that reflects the first display light incident from one surface and causes the second display light incident from the other surface to pass therethrough, and a second reflection member that reflects the first display light reflected by the first reflection member or the second display light that has passed through the first reflection member to guide the first display light or the second display light to the emission port, wherein the first display light is emitted along a first optical path that is reflected by the first reflection member to generate the real image, and the second display light is emitted along a second optical path that passes through the first reflection member and is reflected by the second reflection member to form the virtual image;

a first control unit that controls turning on and off of a plurality of the first light sources of the first backlight; and a second control unit that controls turning on and off of a plurality of the second light sources of the second backlight, wherein, when displaying the virtual image, the second control unit performs control such that at least some of the second light sources are turned on, and, when displaying the real image, the first control unit performs control such that at least some of the first light sources are turned on, and performs control such that power consumption of the first light sources per unit area of the first display is made to be larger than power consumption of the second light sources per unit area of the second display when the virtual image is displayed.

2. The head-up display device according to claim 1, wherein, when displaying the real image, the first control unit performs control such that a current value of a current flowing through the first light source is increased as compared to when the virtual image is displayed by the second control unit.

3. The head-up display device according to claim 1, wherein, when displaying the real image, the first control unit performs control such that the number of the first light sources to be turned on is increased as compared to when the virtual image is displayed by the second control unit.

4. The head-up display device according to claim 1, wherein, when displaying the real image, the first control unit performs control such that a current value of a current flowing through the first light source is increased, and performs control such that the number of the first light sources to be turned on is increased as compared to when the virtual image is displayed by the second control unit.

5. The head-up display device according to claim 1, wherein the first control unit emits the illumination light of the first light source such that the illumination light converges to the first display, and the second control unit emits the illumination light of the second light source such that the illumination light diverges to the second display.

6. The head-up display device according to claim 1, wherein, when displaying the real image, the first control unit performs control such that a mounting density of the first light sources to be turned on on an outer edge side in a long-side direction of a light-source circuit mounting substrate formed of a rectangular region on which the first light sources are mounted is made to be larger than a mounting density of the second light sources to be turned on in an inner region of the outer edge side as compared to when the virtual image is displayed by the second control unit.

7. A control method of a head-up display device that includes: a first backlight including a plurality of first light sources; a first display that causes illumination light of the first light sources to pass therethrough to generate first display light; a second backlight including a plurality of second light sources; a second display that causes illumination light of the second light sources to pass therethrough to generate second display light; an imaging optical system including a first reflection member that reflects the first display light incident from one surface and causes the second display light incident from the other surface to pass therethrough, and a second reflection member that reflects the first display light reflected by the first reflection member or the second display light that has passed through the first reflection member to guide the first display light or the second display light to an emission port, wherein the first display light is emitted along a first optical path that is reflected by the first reflection member to generate a real image, and the second display light is emitted along a second optical path that passes through the first reflection member and is reflected by the second reflection member to form a virtual image; a first control unit that controls turning on and off of the plurality of first light sources of the first backlight; and a second control unit that controls turning on and off of the plurality of second light sources of the second backlight, and emits the first display light or the second display light from the emission port toward a translucent member, thereby causing the real image or the virtual image as a display image represented by the first display light or the second display light to be visually recognized, the control method comprising:

when the second control unit displays the virtual image, a step of performing control such that at least some of the second light sources are turned on; and, when the first control unit displays the real image, a step of performing control such that at least some of the first light sources are turned on, and performing control such that power consumption of the first light sources per unit area of the first display is made to be larger than power consumption of the second light sources per unit area of the second display when the virtual image is displayed.

* * * * *